(12) United States Patent
Matsuura et al.

(10) Patent No.: US 8,508,813 B2
(45) Date of Patent: Aug. 13, 2013

(54) OPTICAL SCANNER

(75) Inventors: Taizo Matsuura, Ama (JP); Jun Mihara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 321 days.

(21) Appl. No.: 13/070,602

(22) Filed: Mar. 24, 2011

(65) Prior Publication Data

US 2011/0292471 A1 Dec. 1, 2011

(30) Foreign Application Priority Data

May 28, 2010 (JP) .................................. 2010-123165

(51) Int. Cl.
*H04N 1/04* (2006.01)

(52) U.S. Cl.
USPC ............ 358/481; 358/474; 358/484; 358/480

(58) Field of Classification Search
USPC ........................... 358/481, 474, 484, 480, 482
See application file for complete search history.

(56) References Cited

U.S. PATENT DOCUMENTS

| | | | |
|---|---|---|---|
| 5,136,160 A * | 8/1992 | Nakane et al. | 250/235 |
| 5,200,611 A | 4/1993 | Hattori | |
| 6,124,948 A * | 9/2000 | Kamioka | 358/409 |
| 6,829,001 B2 * | 12/2004 | Yamakawa | 347/261 |
| 2008/0180773 A1 | 7/2008 | Nakai | |

FOREIGN PATENT DOCUMENTS

| | | |
|---|---|---|
| JP | 3198017 A | 8/1991 |
| JP | 4146409 A | 5/1992 |
| JP | 6109996 A | 4/1994 |
| JP | 2002277786 A | 9/2002 |
| JP | 2004279611 A | 10/2004 |
| JP | 2008-185689 A | 8/2008 |
| JP | 2008286851 A | 11/2008 |

OTHER PUBLICATIONS

Decision of Patent Grant for Japanese patent application No. 2010-123165 mailed Apr. 17, 2012.

* cited by examiner

*Primary Examiner* — Houshang Safaipour
(74) *Attorney, Agent, or Firm* — Banner & Witcoff, Ltd.

(57) ABSTRACT

An optical scanner includes: a light source; a light deflector configured to deflect a light beam from the light source in a main scanning direction; a scanning lens through which the light beam having been deflected by the light deflector passes; a beam detector configured to detect the light beam; a mirror disposed between the light deflector and the scanning lens in an optical axis direction of the scanning lens and configured to reflect the light beam having been deflected by the light deflector toward the beam detector; and a wall portion configured to cover one end face of the mirror that faces the scanning lens, wherein the surface of the wall portion facing the scanning lens is tilted with respect to a sub-scanning direction orthogonal to the main scanning direction.

3 Claims, 6 Drawing Sheets

OPTICAL SCANNER

CROSS-REFERENCE TO RELATED APPLICATION(S)

This application claims priority from Japanese Patent Application No. 2010-123165 filed on May 28, 2010, the disclosure of which is incorporated herein by reference in its entirety.

TECHNICAL FIELD

The present invention relates to an optical scanner.

BACKGROUND ART

In general, an image forming apparatus such as a laser printer includes an optical scanner for exposing the surface of a photoconductor to light. According to one known type, an optical scanner includes a light source (e.g., semiconductor laser), a light deflector (e.g., rotary polygon mirror) configured to reflect and deflect a laser beam from the light source for rapidly sweeping the surface of the photoconductor with the laser beam, a plurality of scanning lenses (e.g., f-theta lenses) through which the laser beam having been deflected by the light deflector passes, a beam detector (e.g. an optoelectronic element) configured to receive the laser beam for determining an image writing timing, and a mirror for reflecting the laser beam having been reflected by the light deflector toward the beam detector. In this arrangement, the mirror is disposed facing one scanning lens.

However, this arrangement of the optical scanner is disadvantageous because a part of the laser beam (i.e., reflected light) having been reflected at the incident-surface or the emission-surface of the scanning lens may possibly be further reflected at an end surface of the mirror and directed into the scanning lens and finally reach the surface (i.e., a target surface to be scanned) of the photoconductor drum. The reflected light reaching the surface of the photoconductor drum may result in a ghost image which deteriorates the overall image quality.

In view of the above, it would be desirable to provide an optical scanner which can suppress the reflected light from entering a target surface to be scanned, so that the deterioration of the image quality can be suppressed.

SUMMARY OF THE INVENTION

According to one aspect of the present invention, there is provided an optical scanner comprising: a light source; a light deflector configured to deflect a light beam from the light source in a main scanning direction; a scanning lens through which the light beam having been deflected by the light deflector passes; a beam detector configured to detect the light beam; a mirror disposed between the light deflector and the scanning lens in an optical axis direction of the scanning lens and configured to reflect the light beam having been deflected by the light deflector toward the beam detector; and a wall portion configured to cover one end face of the mirror that faces the scanning lens, wherein the surface of the wall portion facing the scanning lens is tilted with respect to a sub-scanning direction orthogonal to the main scanning direction.

BRIEF DESCRIPTION OF THE DRAWINGS

To better understand the claimed invention, and to show how the same may be carried into effect, reference will now be made, by way of example only, to the accompanying drawings, in which:

DESCRIPTION OF EMBODIMENTS

A detailed description will be given of an illustrative embodiment of the present invention with reference to the accompanying drawings. In the following description, a general arrangement of an image forming apparatus including an optical scanner according to one embodiment of the present invention will be described, and thereafter the detailed structure of the optical scanner will be described.

<General Arrangement of Laser Printer>

Figure 1:
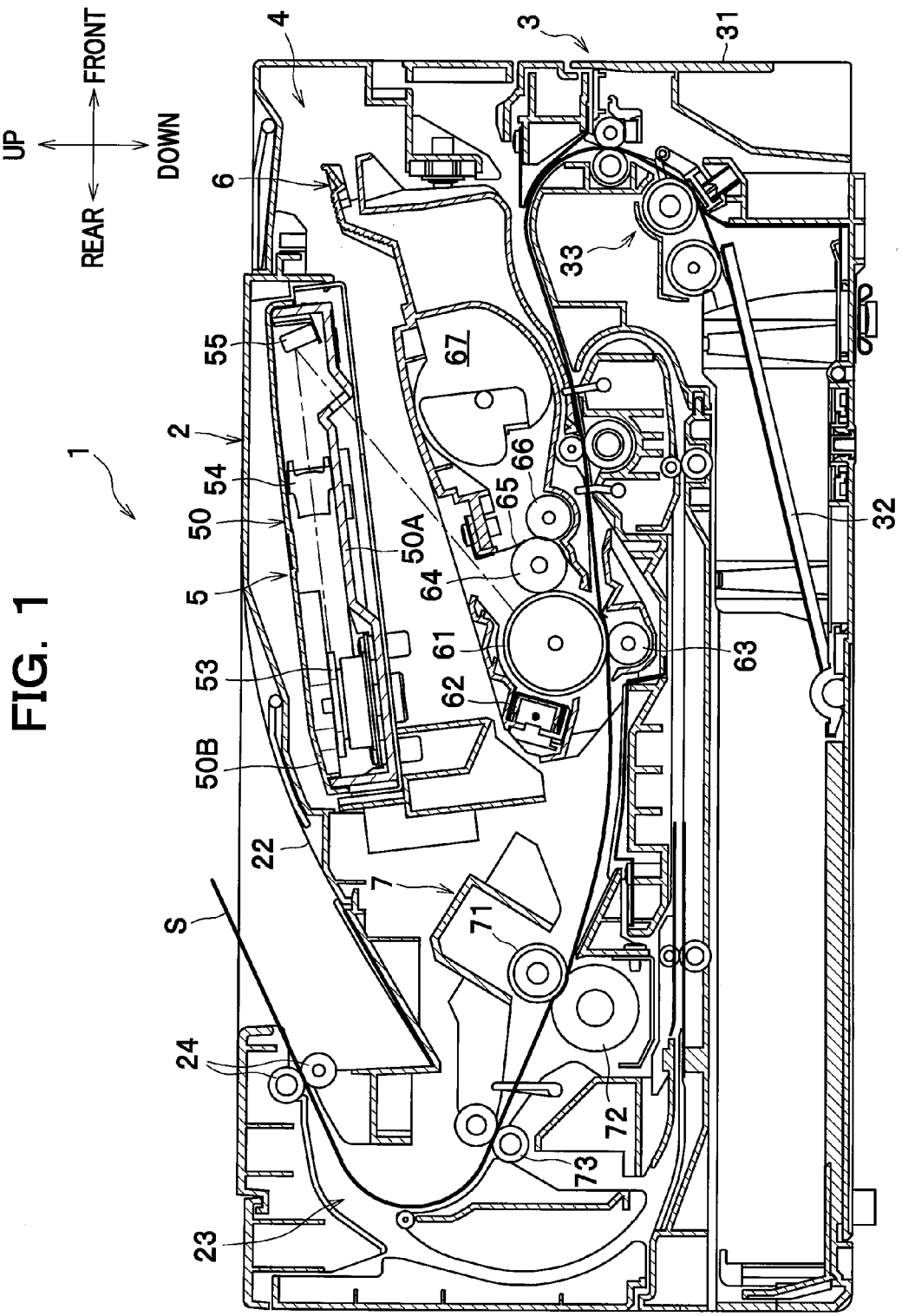
FIG. 1 is a schematic diagram of a laser printer including an optical scanner according to one exemplary embodiment.

As shown in FIG. 1, a laser printer 1 (i.e., image forming apparatus) comprises a body casing 2, and several components housed within the body casing 2 which principally include a sheet feeder unit 3 for feeding a sheet S (e.g., of paper), and an image forming unit 4 for forming an image on the sheet S.

Hereinbelow, in describing the general arrangement of the laser printer 1, the direction is designated as from the viewpoint of a user who is using (operating) the laser printer 1. To be more specific, in FIG. 1, the right-hand side of the drawing sheet corresponds to the "front" side of the laser printer, the left-hand side of the drawing sheet corresponds to the "rear" side of the laser printer, the front side of the drawing sheet corresponds to the "left" side of the laser printer, and the back side of the drawing sheet corresponds to the "right" side of the laser printer. Similarly, the direction extending from top to bottom of the drawing sheet corresponds to the "vertical" or "up/down (upper/lower or top/bottom)" direction of the laser printer.

The sheet feeder unit 3, provided in a lower space within the body casing 2, principally includes a sheet feed tray 31, a sheet pressure plate 32, and a sheet feed mechanism 33. Sheets S stored in the sheet feed tray 31 are urged upward by the sheet pressure plate 32, and then supplied to the image forming unit 4 by the sheet feed mechanism 33.

The image forming unit 4 principally includes an optical scanner 5, a process cartridge 6, and a fixing device 7.

The optical scanner 5 is arranged in the body casing 2 at an upper part thereof, and configured to emit a laser beam (see chain lines) based on image data so that the surface of a photoconductor drum 61 is exposed to light to form an electrostatic latent image on the surface of the photoconductor drum 61. Detailed structure of the optical scanner 5 will be described later.

The process cartridge 6 is disposed below the optical scanner 5 within the body casing 2, and configured to be attached to or detached from the body casing 2 through an opening formed when a front cover (reference numeral omitted) provided at the body casing 2 is swung open. The process cartridge 6 principally includes a photoconductor drum 61, a charger 62, a transfer roller 63, a developing roller 64, a doctor blade 65, a supply roller 66, and a toner reservoir 67 for storing toner (developer).

In the process cartridge 6, the surface of the photoconductor drum 61 is uniformly charged by the charger 62, and then exposed to a rapidly sweeping laser beam from the optical scanner 5 so that an electrostatic latent image based upon image data is formed on the photoconductor drum 61. Meanwhile, toner in the toner reservoir 67 is supplied via the supply roller 66 to the developing roller 64, and goes through between the developing roller 64 and the doctor blade 65 so that a thin layer of toner having a predetermined thickness is carried on the developing roller 64.

The toner carried on the developing roller 64 is supplied from the developing roller 64 to the electrostatic latent image formed on the photoconductor drum 61. Accordingly, the electrostatic latent image is visualized and a toner image is formed on the photoconductor drum 61. Thereafter, while a sheet S is conveyed through between the photoconductor drum 61 and the transfer roller 63, the toner image on the photoconductor drum 61 is transferred onto the sheet S.

The fixing device 7 is provided rearwardly of the process cartridge 6, and principally includes a heating roller 71, and a pressure roller 72 positioned opposite to the heating roller 71 and pressed against the heating roller 71. In the fixing device 7, the toner image transferred onto the sheet S is thermally fixed on the sheet S while the sheet S passes through between the heating roller 71 and the pressure roller 72. The sheet S with the toner image thermally fixed thereon is conveyed by conveyor rollers 73 along a conveying path 23, and ejected from the conveying path 23 onto a sheet output tray 22 by eject rollers 24.

<Detailed Structure of Optical Scanner>

Figure 2:
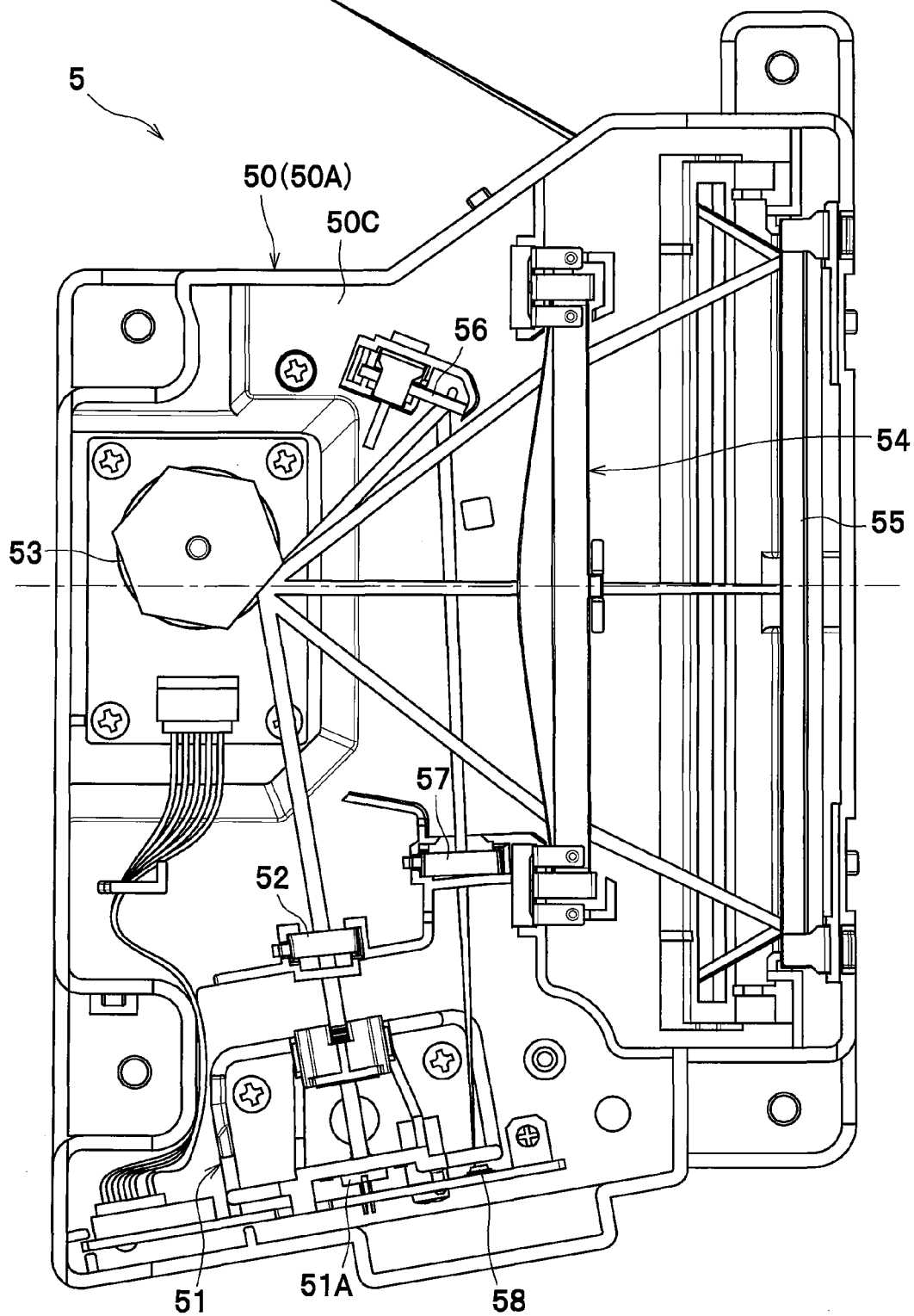
FIG. 2 is a top view of the optical scanner.
Figure 3:
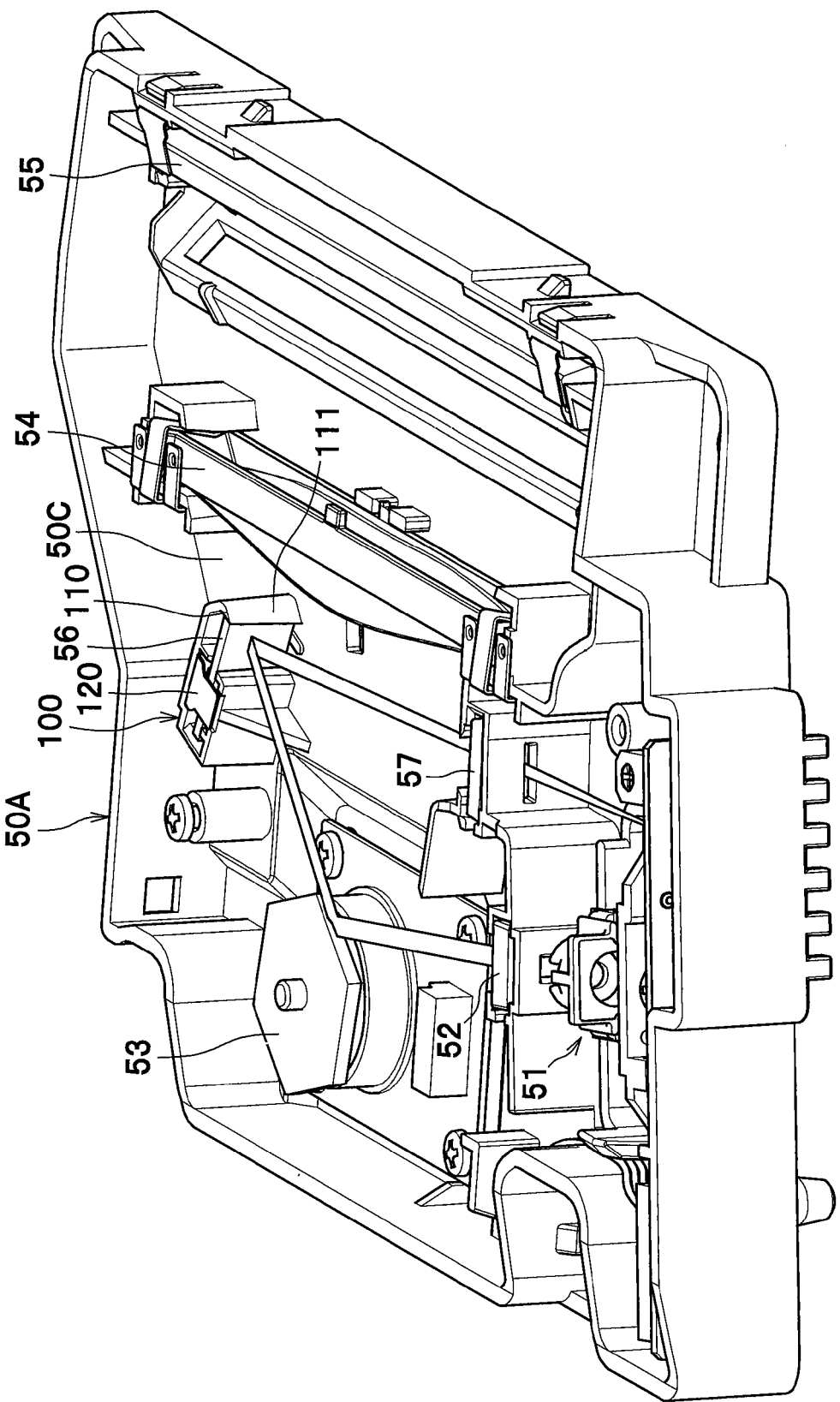
FIG. 3 is a perspective view of the optical scanner with a lid frame being removed.

As seen in FIGS. 2 and 3, the optical scanner 5 comprises a scanner casing 50, and several components housed within the scanner casing 50 which principally include a light source device 51, a cylindrical lens 52, a polygon mirror 53 as an example of a light deflector, a scanning lens 54, reflecting mirrors 55, 56, and a condensing lens 57, and a beam detector 58.

The light source device 51 includes a semiconductor laser 51A as an example of a light source for emitting a laser beam (i.e., light beam), and a coupling lens (not shown) configured to condense the laser beam from the semiconductor laser 51A and convert it into a parallel beam of light.

The cylindrical lens 52 is a lens through which a laser beam emitted from the light source device 51 toward the polygon mirror 53 passes. The cylindrical lens 52 refracts the laser beam emitted from the light source device 51 and converges the laser beam in a sub-scanning direction (i.e., direction orthogonal to a main scanning direction) to condense it onto the polygon mirror 53 (i.e., reflecting surfaces thereof).

The polygon mirror 53 is shaped like a hexagonal column having six sides constituting reflecting surfaces. The polygon mirror 53 spins at high speed and reflects a laser beam from the light source device 51, so that the laser beam is deflected in the main scanning direction (i.e., up-and-down direction of FIG. 2) and swept out at a constant angular velocity.

The scanning lens 54 is a lens through which the laser beam having been deflected by the polygon mirror 53 passes. The scanning lens 54 converts the laser beam having been deflected by the polygon mirror 53 at a constant angular velocity into a laser beam that scans the surface of the photoconductor drum 61 at a constant linear velocity. The scanning lens 54 also refracts the laser beam having been reflected by the polygon mirror 53 so the laser beam is converged in the sub-scanning direction and condensed on the surface of the photoconductor drum 61, to thereby correct an optical face tangle error of the polygon mirror 53.

The reflecting mirror 55 reflects the laser beam having passed through the scanning lens 54 toward the photoconductor drum 61 (see also FIG. 1).

The reflecting mirror 56 (i.e., mirror) is disposed between the polygon mirror 53 and the scanning lens 54 in an optical axis direction of the scanning lens 54 (i.e., direction along which the alternate long and short dashed line of FIG. 2 extends). The reflecting mirror 56 reflects the laser beam having been reflected (deflected) by the polygon mirror 53 toward the beam detector 58.

The condensing lens 57 is a lens through which the laser beam directed from the reflecting mirror 56 toward the beam detector 58 passes. The condensing lens 57 refracts the laser beam having been reflected by the reflecting mirror 56 and converges it in the main scanning direction and the sub-scanning direction, so that the laser beam is focused on the detection surface of the beam detector 58.

The beam detector 58 is a sensor for detecting the laser beam. The optical scanner 5 is configured such that when a predetermined time elapses after the beam detector 58 detects the laser beam, the light source device 51 (semiconductor laser 51A) is controlled to start flickering of the laser beam based on the image data. Accordingly, image writing positions on the surface (target surface to be scanned) of the photoconductor drum 61 can be neatly aligned. Since the configuration and the manner of controlling the image writing positions on the target surface to be scanned are already known in the art, detailed description thereof will be omitted in this specification.

In the optical scanner 5, the laser beam emitted from the light source device 51 and regulated based on the image data is reflected by or passes through the cylindrical lens 52, the polygon mirror 53, the scanning lens 54, and the reflecting mirror 55, in this order, so that the surface of the photoconductor drum 61 is rapidly scanned with the laser beam (see FIG. 1). Accordingly, the surface of the photoconductor drum 61 is exposed to the laser beam, and an electrostatic latent image based on the image data is formed on the surface of the photoconductor drum 61.

The scanner casing 50 is a casing configured to house several components such as the light source device 51, the polygon mirror 53, the scanning lens 54, the reflecting lens 56, and the beam detector 58. As seen in FIG. 1, the scanner casing 50 principally includes a box-like base frame 50A having an open top, and a lid frame 50B attached to and covering the base frame 50A.

The base frame 50A and the lid frame 50B (i.e., scanner casing 50) is produced, for example, by injection molding comprising the steps of injecting molten resin into a mold, cooling and hardening the molten resin, and removing the molded part from the mold. Since the molding method (manufacturing method) for the scanner casing 50 is known in the art, detailed description thereof will be omitted in this specification.

Figure 4:
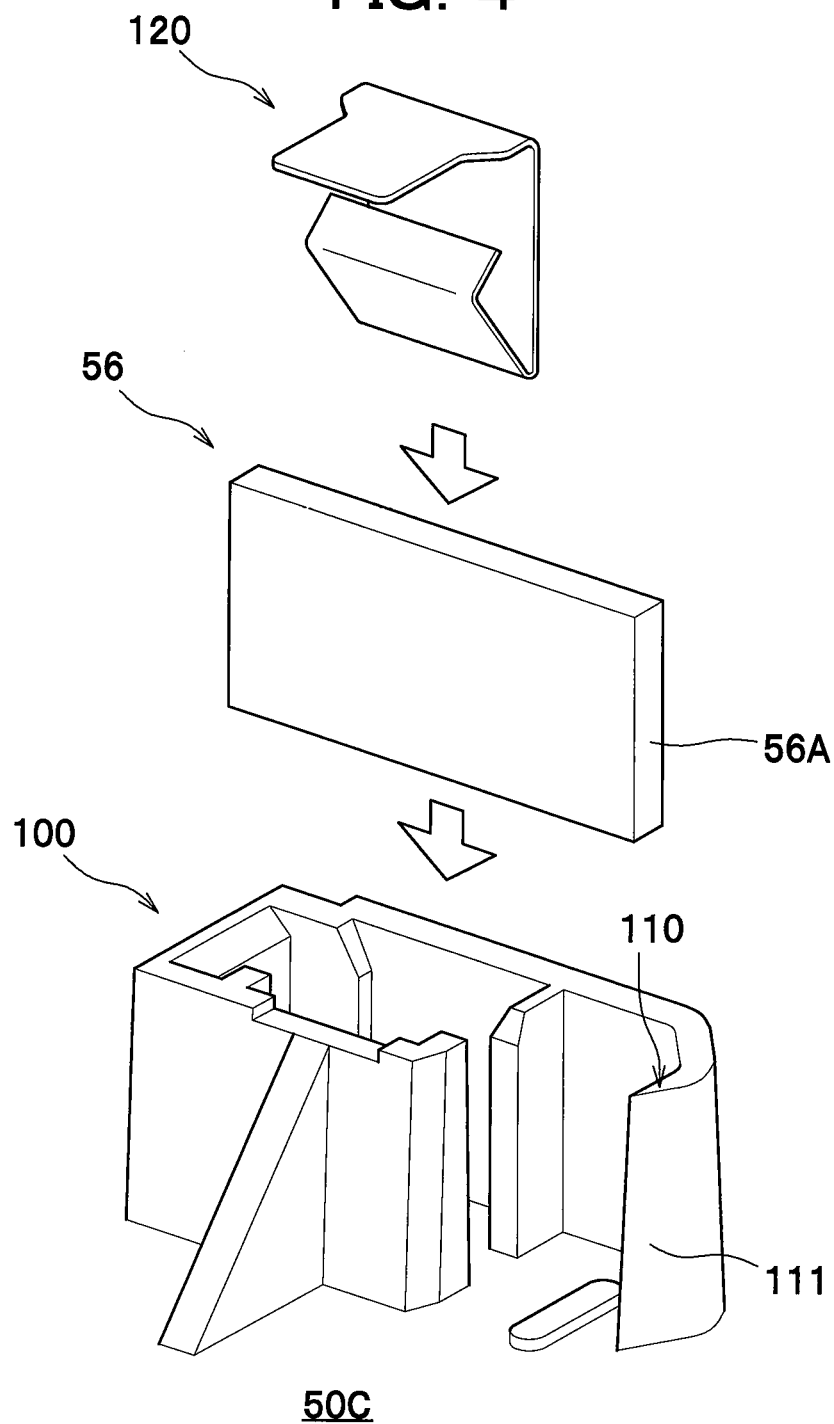
FIG. 4 is an exploded perspective view illustrating a mirror attachment portion, a reflecting mirror and a leaf spring.

As seen in FIG. 3, the base frame 50A has a bottom wall portion 50C and a mirror attachment portion 100. The mirror attachment portion 100 is integrally molded with the bottom wall portion 50C (base frame 50A). As seen in FIG. 4, the reflecting mirror 56 is attached to the base frame 50A (i.e., scanner casing 50) through the mirror attachment portion 100, with which the reflecting mirror 56 is engageable. Further, a leaf spring 120 is attached to the mirror attachment portion 100, so that the reflecting mirror 56 is urged in the frontward direction of FIG. 4 and is retained (secured) in the mirror attachment portion 100 (i.e., scanner casing 50) as shown in FIG. 3.

Figure 5:
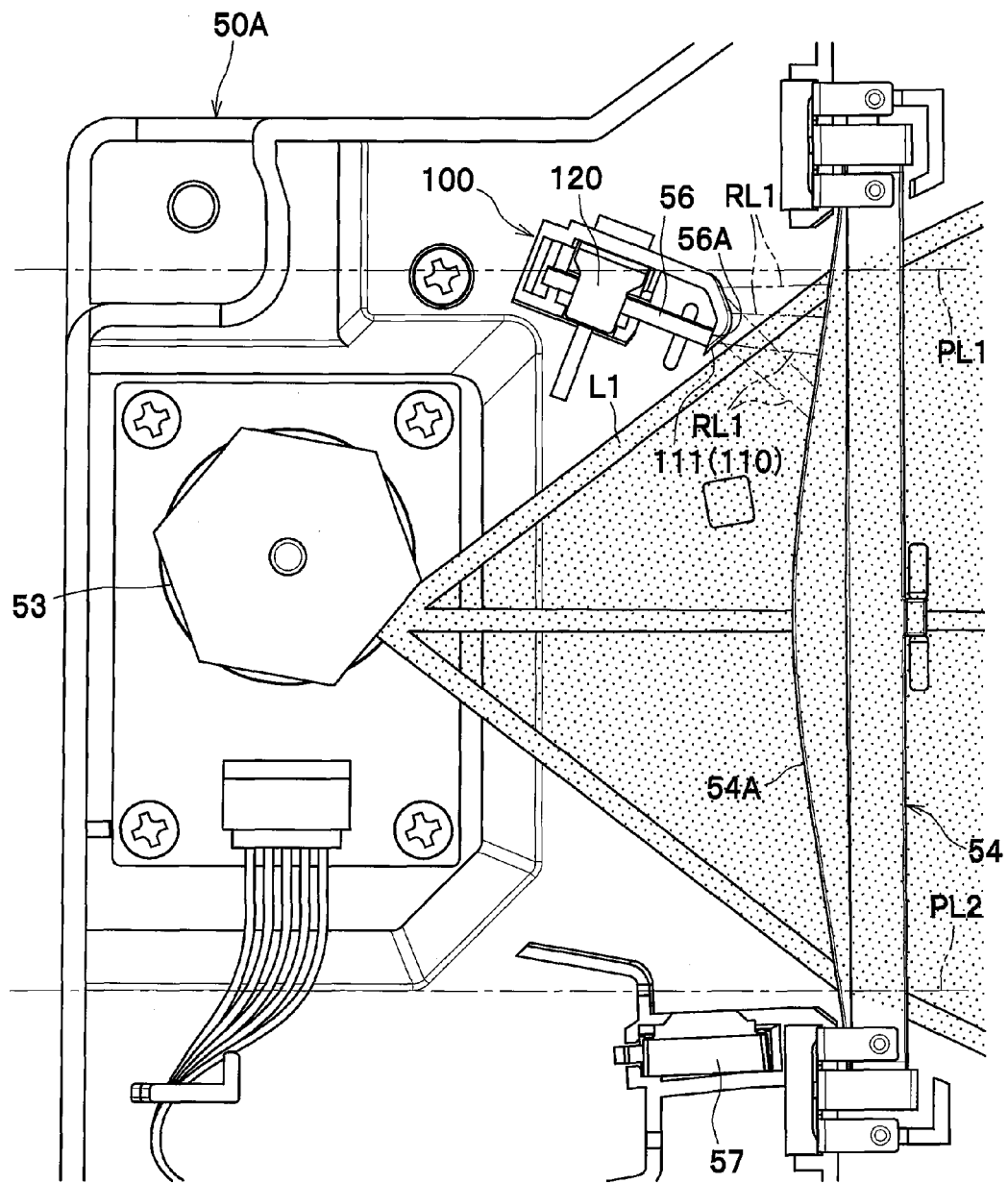
FIG. 5 is a top view showing the configuration around the mirror attachment portion.

As best seen in FIG. 5, the reflecting mirror 56 attached to the mirror attachment portion 100 has an end face 56A (i.e., one end face) facing the scanning lens 54. The end face 56A is positioned to overlap a region defined by planes PL1, PL2 extending parallel to the optical axis direction from both ends of an effective scanning region of the scanning lens 54 (at a laser beam incident-surface 54A thereof). Herein, the term "effective scanning region" indicates a part of the scanning region of the laser beam having been deflected by the polygon mirror 53 and particularly used for image formation (see hatched region in the figure).

According to the arrangement of the reflecting mirror 56 as described above, the size of the scanner casing 50 can be reduced as compared with an arrangement in which the entire reflecting mirror 56 is positioned outside the region defined by the planes PL1, PL2. This arrangement of the reflecting mirror 56, on the other hand, may disadvantageously result in that a part of the laser beam having been reflected by the scanning lens 54 (hereinafter referred to as a reflected light beam RL1) is directed to the end face 56A of the reflecting mirror 56.

Figure 6:
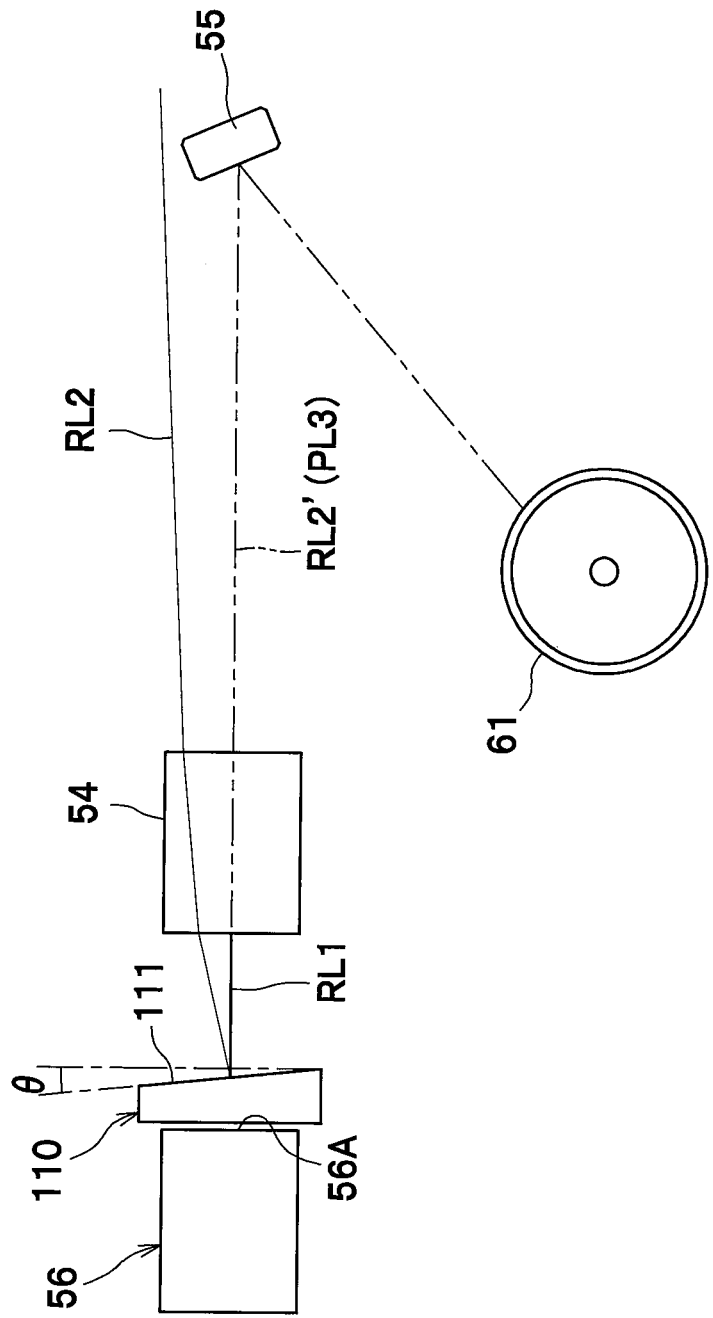
FIG. 6 is a schematic view explaining the configuration and function of a wall portion.

As seen in FIGS. 3, 4 and 5, the mirror attachment portion 100 has a wall portion 110 extending from the reflecting mirror 56 in the vicinity of the reverse side of its reflecting surface to a space between the end face 56A and the scanning lens 54; as viewed from the scanning lens 54 side, the wall portion 110 covers the end face 56A of the reflecting mirror 56. As schematically shown in FIG. 6, the wall portion 110 has a counterface surface 111 facing the scanning lens 54, and the counterface surface 111 is tilted upward with respect to the sub-scanning direction (i.e., the up-and-down direction of FIG. 6).

In this exemplary embodiment, the tilt angle θ of the counterface surface 111 is greater than a draft of a mold used for forming the base frame 50A (wall portion 110). To be more specific, in the case where the draft is in the range between 0.5-1 degree, the tilt angle may be approximately 2 degrees.

Further, as seen in FIG. 5, the counterface surface 111 of the wall portion 110 extends along a ray trajectory of the laser beam L1 passing near the reflecting mirror 56 as viewed from the sub-scanning direction. To be more specific, the wall portion 110 has an acute distal end portion facing the condensing lens 57 as viewed from the sub-scanning direction, and the distal end portion extends parallel to the ray trajectory of the laser beam L1.

With the configuration of the optical scanner 5 according to this embodiment, the following advantageous effects can be achieved.

Since there is provided the wall portion 110 which covers the end face 56A of the reflecting mirror 56 facing the scanning lens 54, it is possible to suppress the reflection at the end face 56A caused by the reflected light beam RL1 from the scanning lens 54.

Further, since the counterface surface 111 of the wall portion 110 facing the scanning lens 54 is tilted upward with respect to the sub-scanning direction, as best seen in FIG. 6, even if a part of the reflected light beam RL1 from the scanning lens 54 is reflected by the wall portion 110 (i.e., at the counterface surface 111), the reflected light beam RL2 reflected by the wall portion 110 travels in a direction (i.e., obliquely upward direction of FIG. 6) different from the one re-entering the reflecting lens 54.

If the counterface surface 111 of the wall portion 110 is parallel to the sub-scanning direction, the reflected light beam RL2' reflected at the wall portion 110 may travel back in a direction along the main scanning direction PL3 (i.e., in FIG. 6, the reflected light beam RL2' may travel in a direction returning the traveling path of the reflected light beam RL1). Therefore, the reflected light beam RL2' may pass through the scanning lens 54, and be reflected by the reflecting mirror 55, and finally reach the surface (i.e., target surface to be scanned) of the photoconductor drum 61.

As described previously in this embodiment, the end face 56A of the reflecting mirror 56 is covered by the wall portion 110 and the counterface surface 111 of the wall portion 110 is tilted upward, so that it is possible to suppress the reflected light beam RLI from the scanning lens 54 from entering the photoconductor drum 61. This can suppress an occurrence of a ghost image and hence the deterioration of the image quality.

Further, since the wall portion 110 that is integrally molded with the base frame 50A has a slant, the optical scanner 5 can be manufactured more easily and with lower cost, as compared with the configuration in which the end face 56A of the reflecting mirror 56 has a slant, namely, the reflecting mirror 56 per se is processed obliquely.

As with the above embodiment, the present invention is particularly advantageous in an arrangement in which at least part of the end face 56A of the reflecting mirror 56 is positioned within a region defined by planes PL1, PL2 extending parallel to the optical axis direction from both ends of the effective scanning region of the scanning lens 54. This is because, in this arrangement, a part of the reflected light beam RL1 from the scanning lens 54 is directed to the end face 56A as described above.

According to the arrangement of the above embodiment in which at least part of the end face 56A of the reflecting mirror 56 is positioned within the region between the planes PL1, PL2, the size of the optical scanner 5 can be reduced.

Further, in the arrangement in which at least part of the end face 56A of the reflecting mirror 56 is positioned within the region between the planes PL1, PL2, the optical scanner 5 is configured such that the counterface surface 111 of the wall portion 110 extends along the ray trajectory of the laser beam L1. Therefore, the size of the optical scanner 5 can be reduced and the laser beam having been deflected by the polygon mirror 53 and regulated based on the image data can reliably reach the surface of the photoconductor drum 61.

Although an illustrative embodiment of the present invention has been described above, the present invention is not limited to this specific embodiment. It is to be understood that various changes and modifications may be made to any of the specific configurations without departing from the scope of the present invention.

In the above-describe embodiment, the wall portion 110 is tilted upward with respect to the sub-scanning direction. However, the present invention is not limited to this specific configuration, and the wall portion 110 may be tilted downward with respect to the sub-scanning direction.

In the above-described embodiment, the wall portion 110 is provided as a part of the mirror attachment portion 100. However, the present invention is not limited to this specific configuration, and the wall portion 110 may be provided independently from a portion for attachment of the mirror.

In order to suppress the reflection of the reflected light beam having been reflected by the scanning lens at the wall portion, a part of the surfaces of the wall portion that faces the scanning lens may be applied with a coating material for absorbing the light beam, or provided with a light beam absorbing member.

In the above-described embodiment, the end face 56A (one end face) of the reflecting mirror 56 (mirror) is positioned to overlap the region defined by planes PL1, PL2 extending parallel to the optical axis direction from both ends of the effective scanning region of the scanning lens 54. However, the present invention is not limited to this specific configuration, and the one end face of the mirror may be positioned outside the region defined by planes extending parallel to the optical axis direction from both ends of the effective scanning region of the scanning lens. In this arrangement of the mirror, the counterface surface of the wall portion that faces the scanning lens may not be slanted with respect to the one end face of the mirror as viewed from the sub-scanning direction.

In the above-described embodiment, the light source device 51 emits a laser beam (light beam) having been converted into a parallel beam of light. However, the present invention is not limited to this specific configuration, and the light source device may emit a convergent light beam or a divergent light beam.

In the above-described embodiment, the polygon mirror 53 is used as an example of a light deflector; the polygon mirror 53 has rotatable reflecting surfaces for deflecting the laser beam (i.e., light beam). However, the present invention is not limited to this specific configuration. For example, the polygon mirror 53 may be replaced with a vibrating mirror having a reflecting surface which vibrates to deflect the laser beam.

In the above-described embodiment, the laser printer 1 is used as an example of an image forming apparatus. However, the present invention is applicable to other image forming apparatuses such as a copying machine and multifunction peripheral. Further, in the above-described embodiment, the optical scanner according to the present invention is applied to an image forming apparatus (i.e., laser printer 1). However, the present invention is not limited to this specific embodiment, and the optical scanner is applicable to a measurement apparatus or an inspection apparatus which can preferably suppress reflected light from entering a target surface to be scanned.

What is claimed is:

1. An optical scanner comprising:
   a light source;
   a light deflector configured to deflect a light beam from the light source in a main scanning direction;
   a scanning lens through which the light beam having been deflected by the light deflector passes;
   a beam detector configured to detect the light beam;
   a mirror disposed between the light deflector and the scanning lens in an optical axis direction of the scanning lens and configured to reflect the light beam having been deflected by the light deflector toward the beam detector; and
   a wall portion configured to cover one end face of the mirror that faces the scanning lens,
   wherein the surface of the wall portion facing the scanning lens is tilted with respect to a sub-scanning direction orthogonal to the main scanning direction.

2. The optical scanner according to claim 1, wherein the mirror is disposed such that at least part of the one end face thereof is positioned within a region defined by planes extending parallel to the optical axis direction from both ends of an effective scanning region of the scanning lens.

3. The optical scanner according to claim 2, wherein as viewed from the sub-scanning direction, the surface of the wall portion facing the scanning lens extends along a ray trajectory of the light beam passing near the mirror.

* * * * *